Aug. 6, 1940.   R. N. BROWN   2,210,615
MACHINE FOR ASSEMBLING ARTICULATED ELEMENTS
Filed Jan. 16, 1936   11 Sheets-Sheet 1
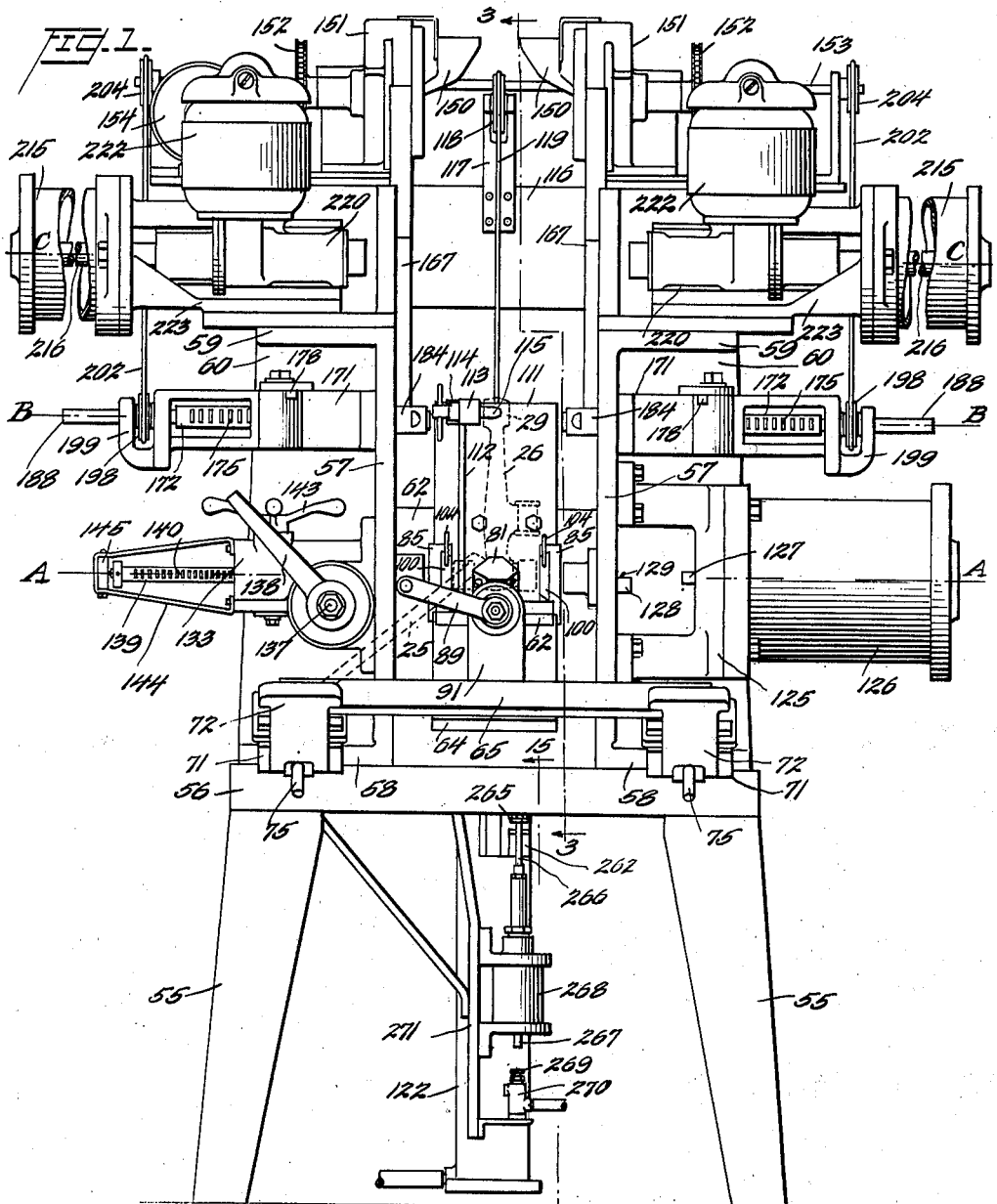
Inventor
R. N. Brown
By Watson, Cole, Moses
& Grindle
Attorneys

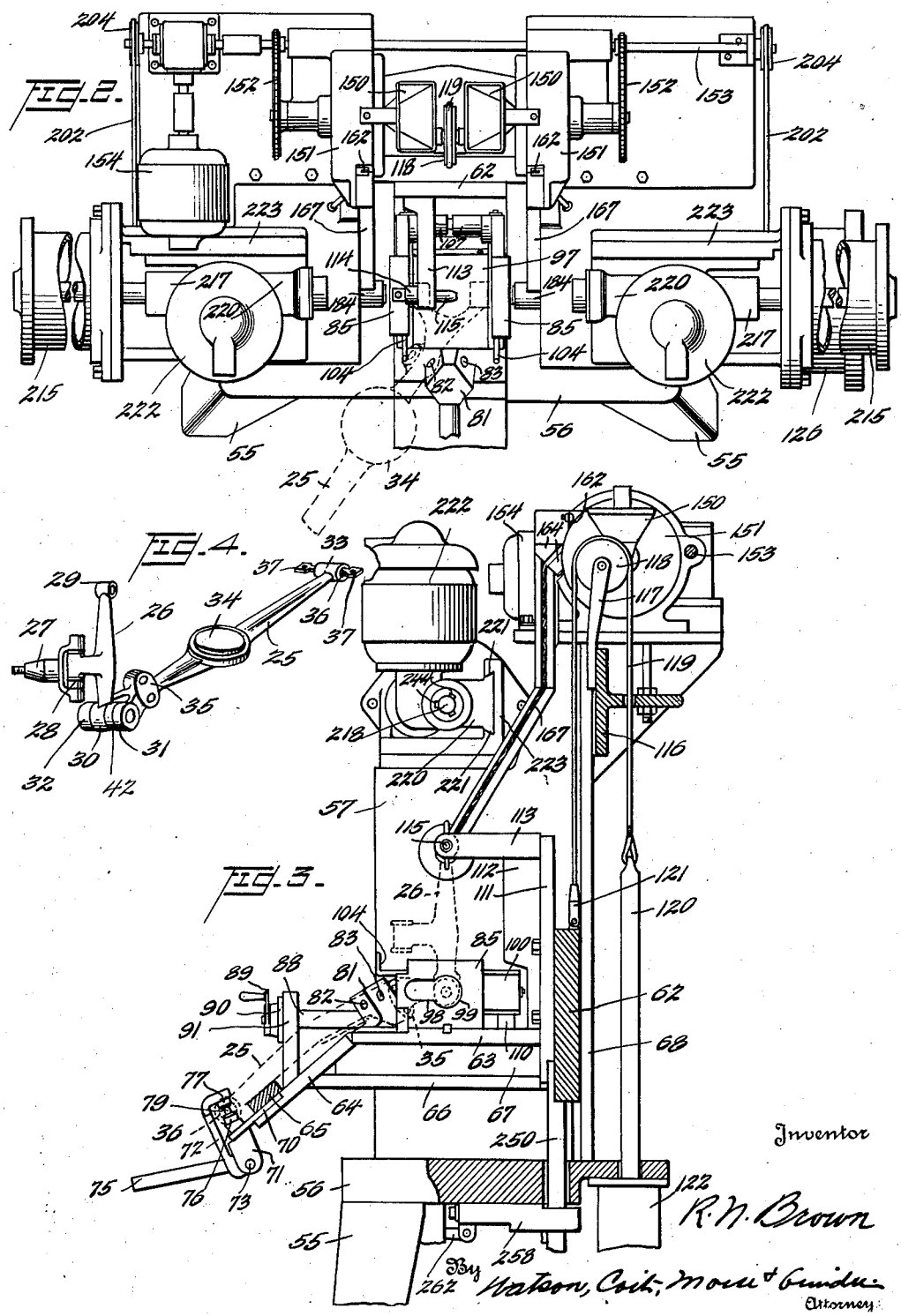

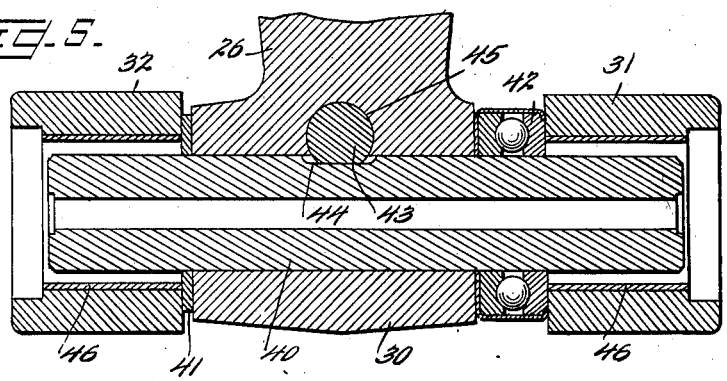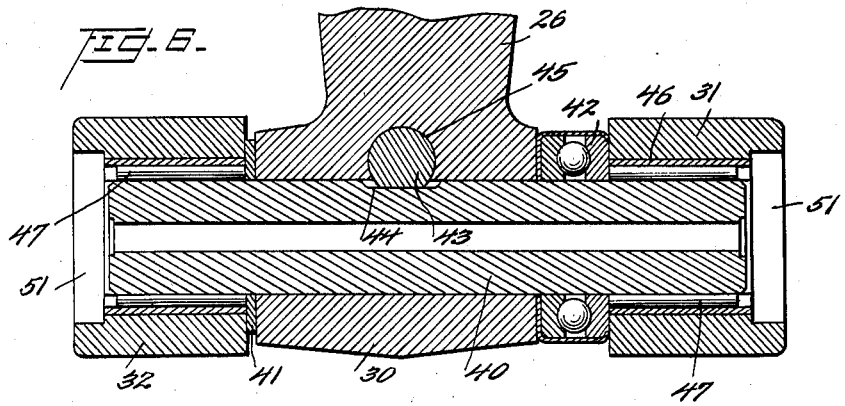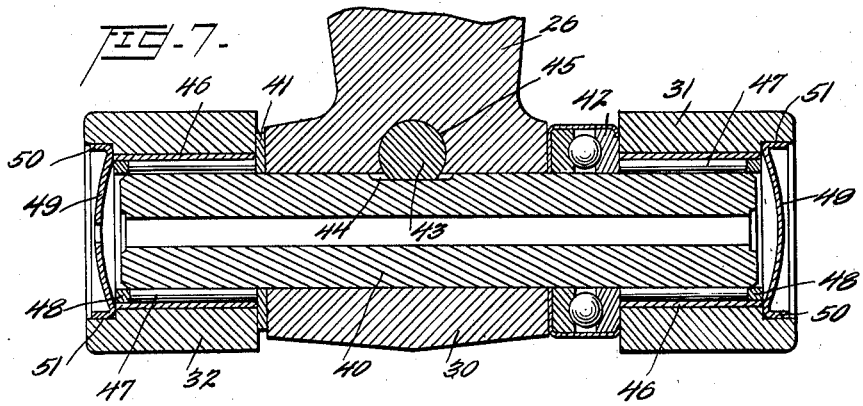

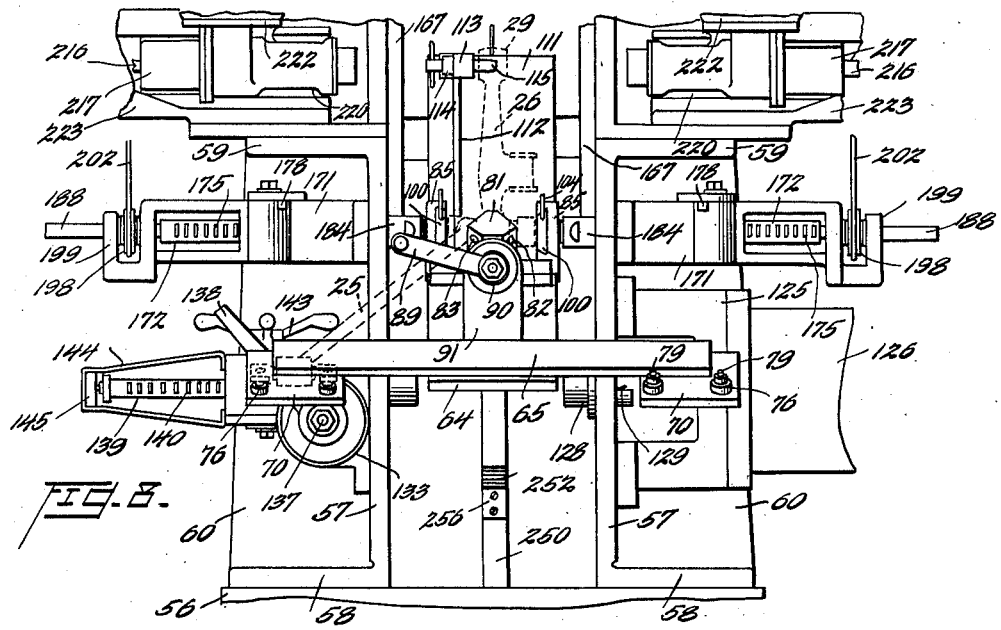

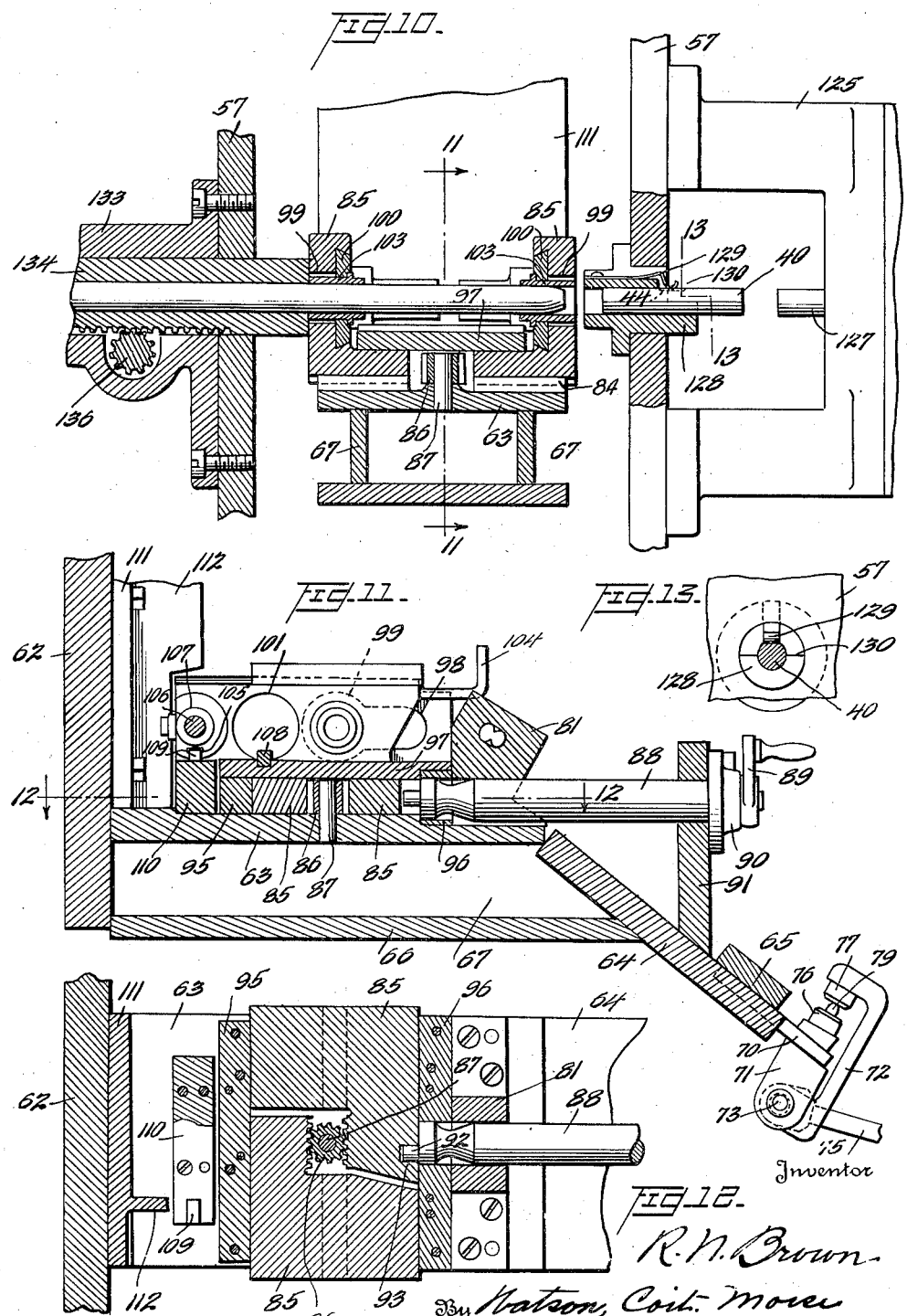

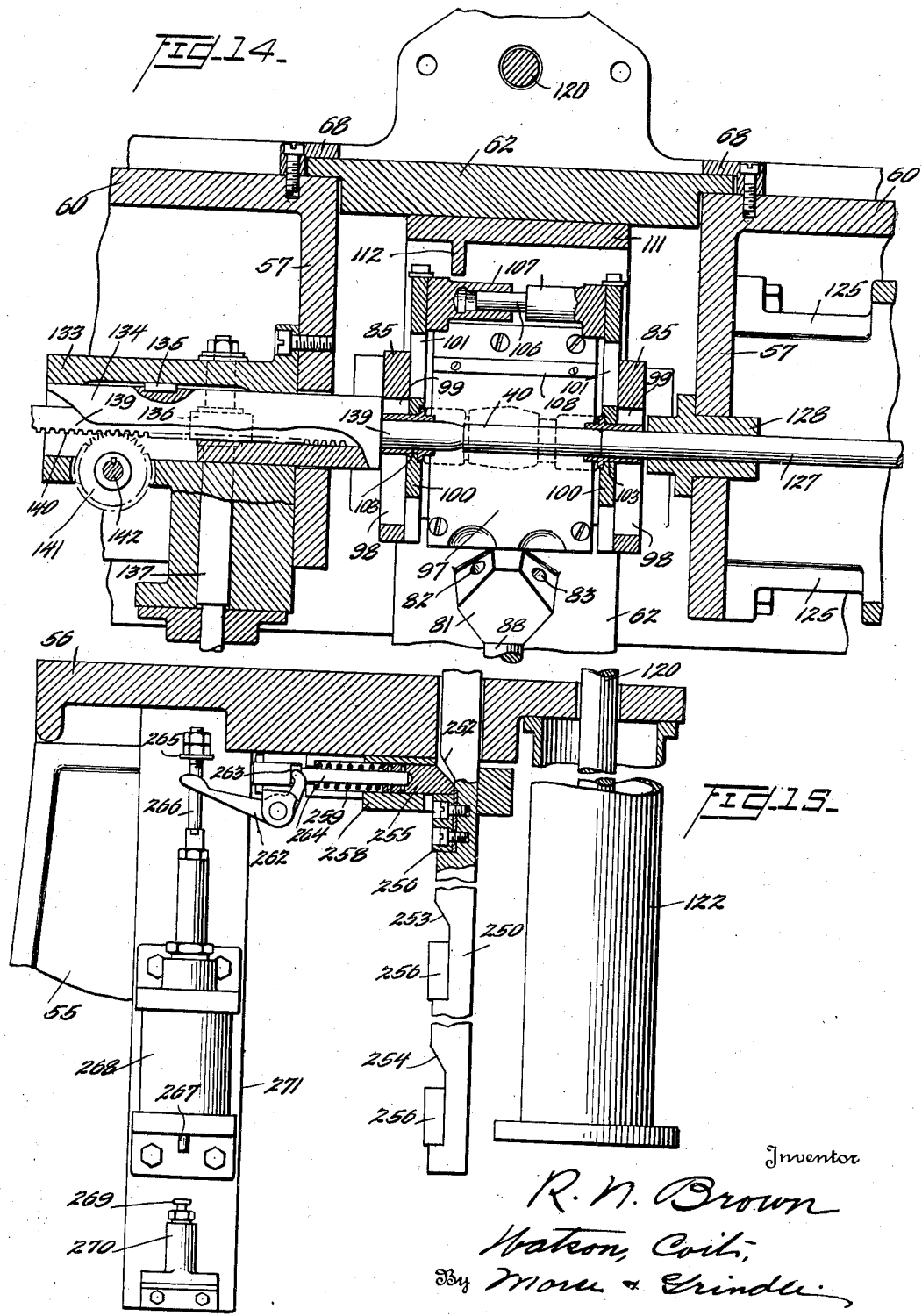

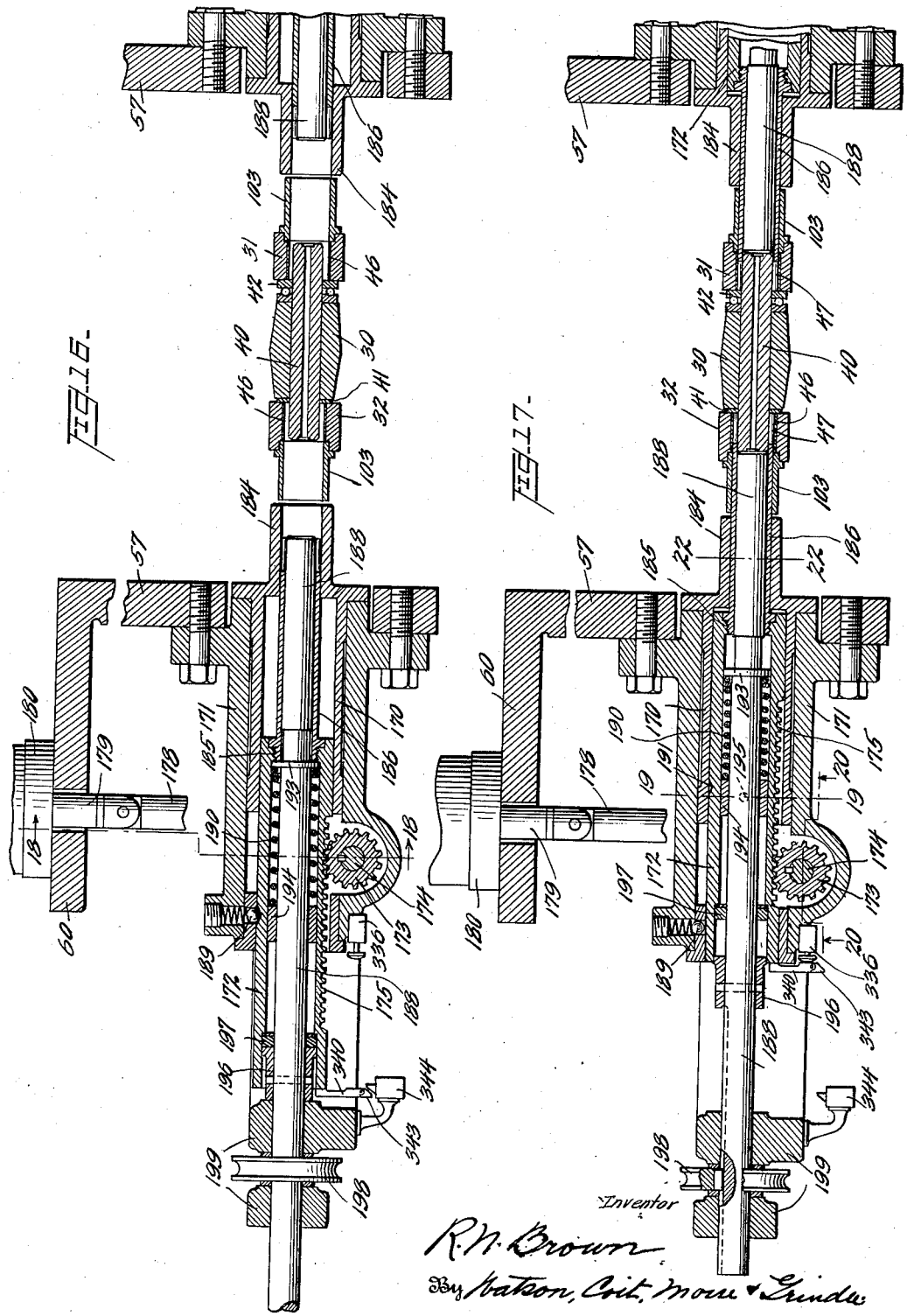

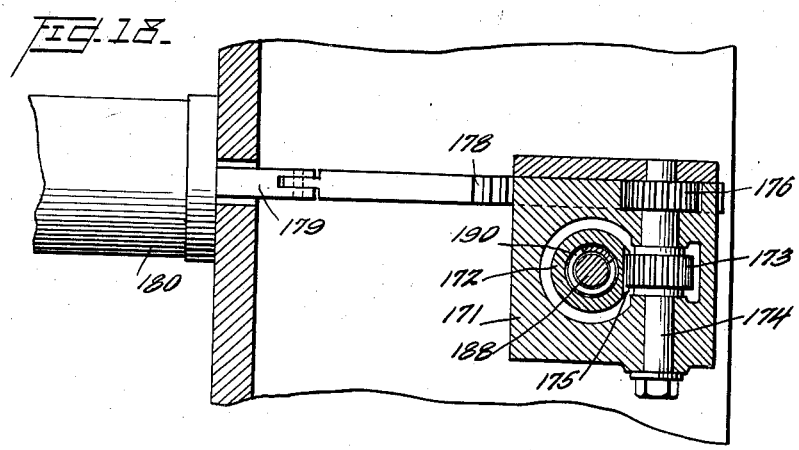
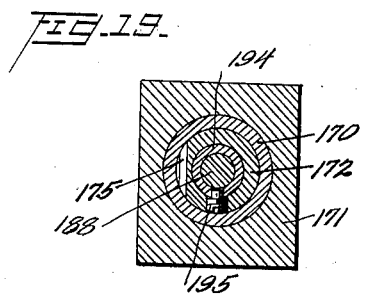
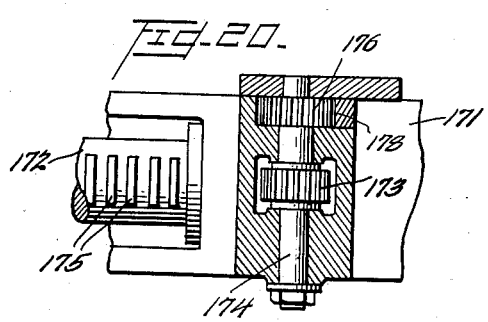
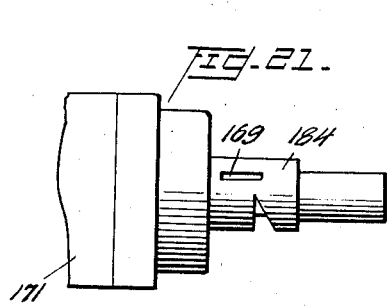
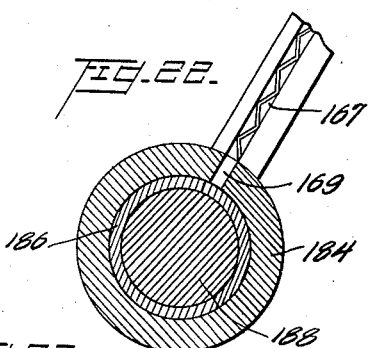
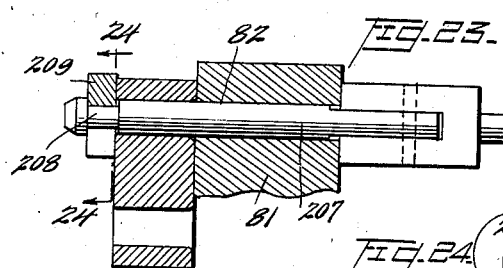
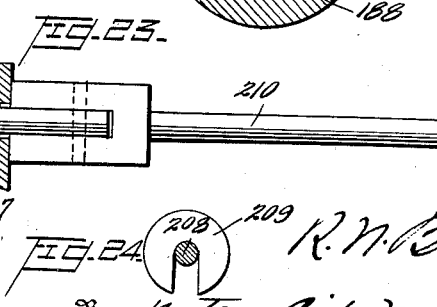

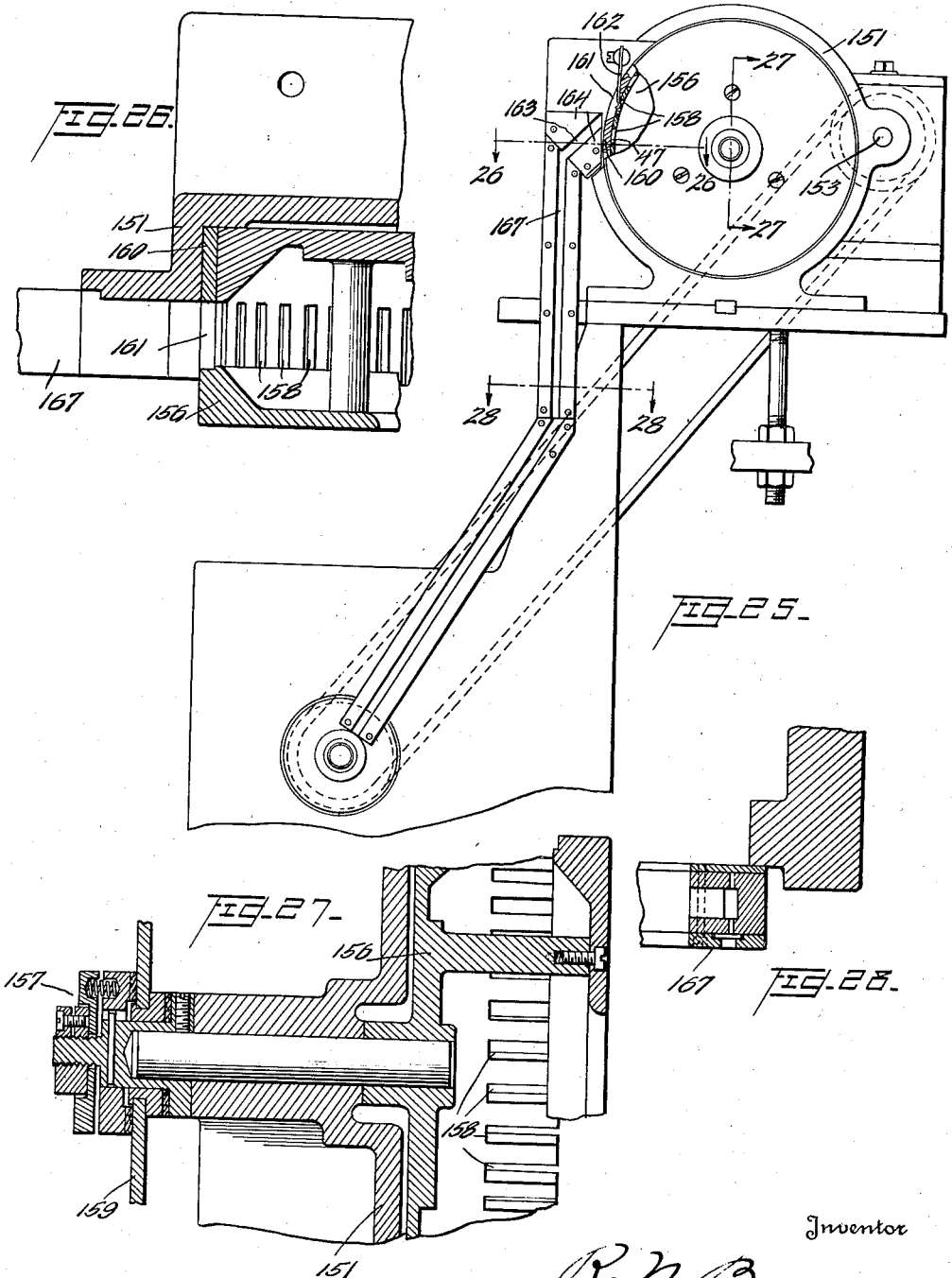

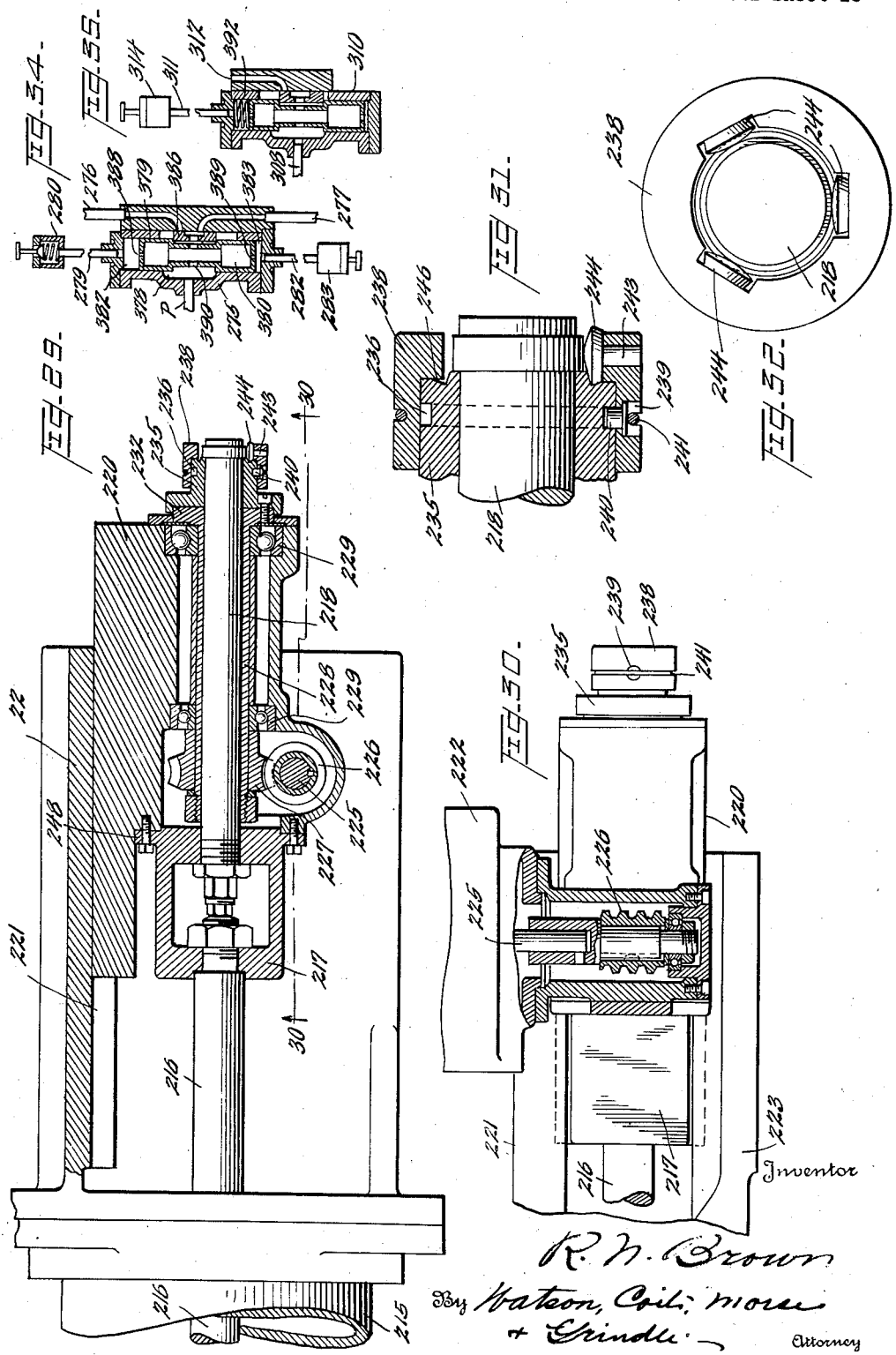

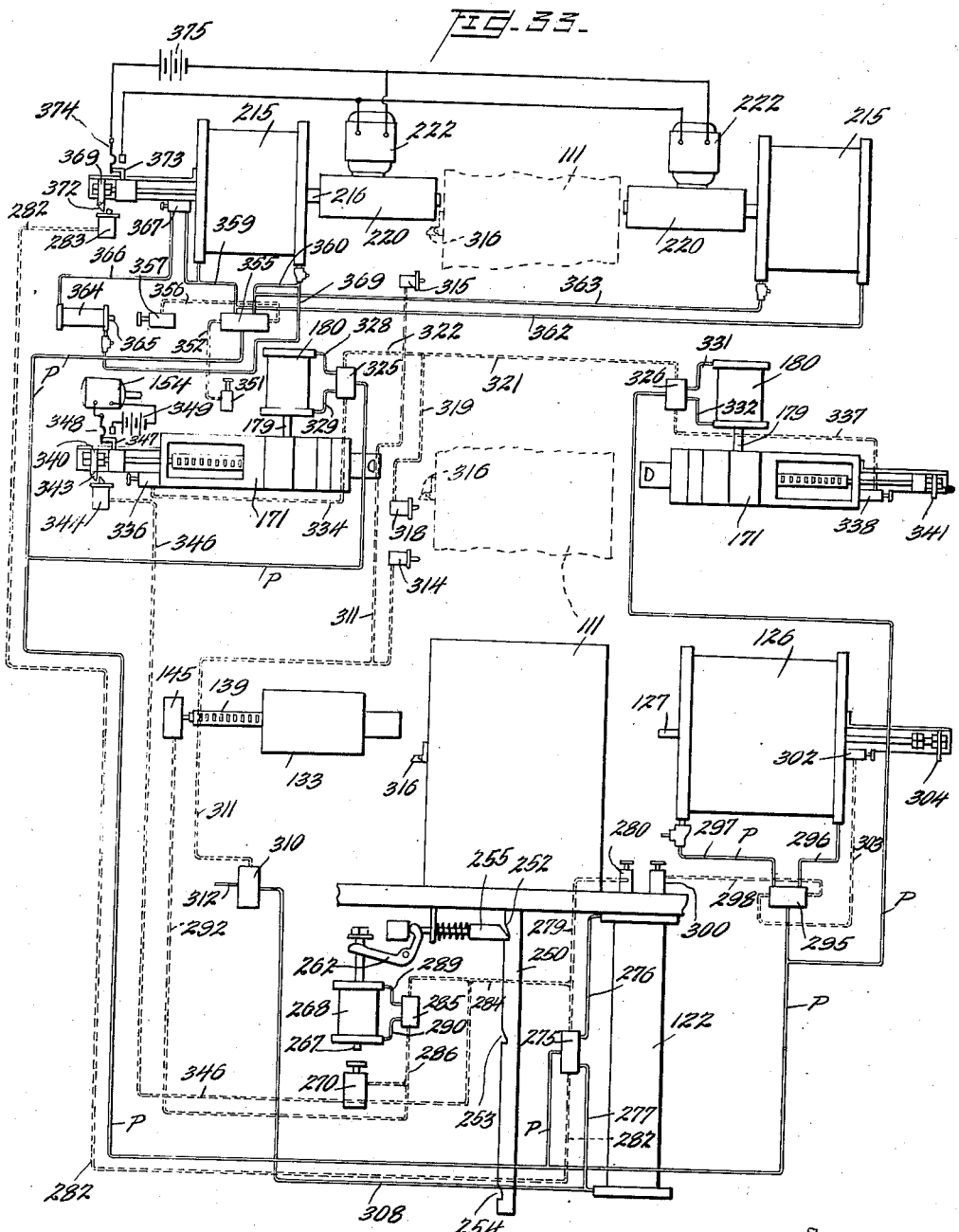

Patented Aug. 6, 1940

2,210,615

UNITED STATES PATENT OFFICE 2,210,615

MACHINE FOR ASSEMBLING ARTICULATED ELEMENTS

Robert N. Brown, Detroit, Mich., assignor to Packard Motor Car Company, Detroit, Mich., a corporation of Michigan Application January 16, 1936, Serial No. 59,469

5 Claims. (Cl. 29—84)

This invention relates to apparatus for assembling machine elements and is more particularly concerned with the assembly of two members to provide a hinged or pivoted connection therebetween. It is the principal object of the invention to provide apparatus to carry out each of several required operations at different stations, to provide means for conveying the elements being assembled from one station to another, and to coordinate the conveying mechanism and the operating mechanisms at the several stations so that the machine will function largely or wholly in an automatic manner and with a minimum of attention on the part of an operator.

The present invention has resulted from the adoption in this country of independent wheel suspension systems for motor vehicles, heretofore used principally in Europe, a number of these suspension systems employing pivoted links for supporting the frame on the vehicle wheels. High speed production of motor vehicles as practiced in this country necessitates the elimination of hand operations wherever possible and one of the difficulties encountered in the adoption of independent wheel suspensions here is the excessive time required for manual assembly of the pivotal connections employed therein.

The invention is accordingly illustrated herein as applied to the assembly of a pivotal connection between a suspension link and a wheel carrier unit, and the connection shown is of the anti-friction type employing a pivot pin and anti-friction bearings. The assembly of this type of connection by hand is a very tedious operation and the time required is such that mass production of vehicles is rendered difficult. By the employment of the present invention the assembly may be effected not only with very much greater rapidity, but with increased accuracy and uniformity.

It will nevertheless be appreciated that while this preferred use of the apparatus is described herein, the invention is by no means thus limited in its application. On the contrary, apparatus of this character is capable of assembling any two members to form a pivotal connection therebetween and is useful in the assembly of other types of pivotal joints than that illustrated, the mode of assembly and the elements of the machine being varied to meet the requirements.

In its more specific aspect the invention comprises apparatus operable on two machine elements for assembling a pivot pin between the elements, introducing anti-friction bearings, and closing the joint thus formed to prevent unintentional displacement of the parts thereof. Preferably the pivot pin is introduced at one station, the anti-friction bearings at a second station, and the closing or retaining means at a third station, these stations being conveniently respectively designated A, B, and C. Carrier or conveyor apparatus which is adapted to support the two machine elements in operative relation serves to carry these elements from one station to another and to retain them in proper position at each station until the desired operation is completed.

Further objects and features of the invention will be apparent from the following description taken in connection with the accompanying drawings, in which Figure 1 is a front elevation of a machine constructed in accordance with the invention and showing a link and wheel carrier in dotted lines in the position which they occupy for the performance of an operation at station A;

Figure 2 is a plan view of the structure shown in Figure 1;

Figure 3 is a vertical section approximately on the line 3—3 of Figure 1;

Figure 4 is a perspective illustration of an assembled link and wheel carrier;

Figures 5, 6, and 7 are fragmentary sectional views through the link and wheel carrier illustrating the operations performed thereon at stations A, B, and C respectively;

Figures 8 and 9 are partial front elevations corresponding to Figure 1 and showing the link and wheel carrier and the elements of the support therefor at stations B and C respectively;

Figure 10 is a fragmentary vertical sectional view through parts of the carriage showing the mode of cooperation of the mechanism at station A therewith;

Figure 11 is a section on the line 11—11 of Figure 10;

Figure 12 is a section on the line 12—12 of Figure 11;

Figure 13 is a detailed sectional view on the line 13—13 of Figure 10;

Figure 14 is a horizontal sectional view on the line A—A of Figure 1;

Figure 15 is a fragmentary vertical sectional view on the line 15—15 of Figure 1;

Figure 16 is a partial horizontal section on the line B—B of Figure 1;

Figure 17 is a sectional view corresponding to Figure 16 and illustrating the parts in a different position;

Figure 18 is a section on the line 18—18 of Figure 16;

Figure 19 is a section on the line 19—19 of Figure 17;

Figure 20 is a section on the line 20—20 of Figure 17;

Figure 21 is a fragmentary plan view of the elements shown in Figures 16 and 17;

Figure 22 is a section on the line 22—22 of Figure 17;

Figure 23 is a section on the line 23—23 of Figure 9;

Figure 24 is a section on the line 24—24 of Figure 23;

Figure 25 is an enlarged end elevation of apparatus shown in Figure 2;

Figure 26 is a sectional view taken substantially on the line 26—26 of Figure 25;

Figure 27 is a section on the line 27—27 of Figure 25;

Figure 28 is a fragmentary section taken on the line 28—28 of Figure 25;

Figure 29 is a partial horizontal section on the line C—C of Figure 1;

Figure 30 is a section on the line 30—30 of Figure 29;

Figure 31 is an enlarged sectional view of a detail shown in Figure 29;

Figure 32 is an end elevation of the structure shown in Figure 31;

Figure 33 is a diagrammatic representation of mechanism suitable for the control of the several operations performed by the apparatus; and Figures 34 and 35 are sectional views of pneumatic valves represented in Figure 33.

Referring first to Figure 4 which shows the two machine elements in their assembled relation, it will be observed that the reference character 25 designates a wheel suspension link, a road wheel carrier being indicated at 26, the latter supporting the conventional road wheel spindle 27 for steering movement about a substantially vertical axis by means of the usual steering knuckle 28. The wheel carrier 26 is provided adjacent its upper end with a boss 29 affording a pivotal connection to a second wheel suspension link, not shown, and is formed at its lower end to provide a boss 30 which is to be pivotally connected to the suspension link 25. The outer end of the link 25 is forked to embrace the lower end of the wheel carrier 26 and is provided with bosses 31 and 32 aligned with and pivotally connected to the lower boss 30 on the wheel carrier, a thrust bearing 42 being preferably interposed between the boss 30 and the boss 31.

The link 25 is also formed to provide a spring seat 34 which may receive a coil spring and with an enlarged portion 35 which is apertured for the reception of bolts whereby attachment of the link to a torque arm, not shown, may be effected.

At its inner end the link 25 is provided with a boss 33 for pivotal connection to the vehicle frame, and a pivot pin 36 which functions for this purpose is shown in position in the boss. The connection between this pin and the boss preferably comprises a sheath of rubber interposed therebetween and surface bonded to both, and the pin is provided with flattened outer ends 37 which are apertured for the reception of bolts for securing the pin to a bracket carried on the frame.

The structure thus far described obviously forms no part of the present invention and is shown in detail in the application of Walter R. Griswold, Serial No. 45,347, filed October 16, 1935, this prior application disclosing the entire suspension system and illustrating its mode of operation. On the contrary, the present invention is concerned solely with apparatus for assembling this or any similar mechanism in which a pivotal connection is employed.

The connection between the wheel carrier 26 and the suspension link 25 is illustrated in more detail in Figures 5 to 7 inclusive which show successive steps in the assembly as preferably carried out. It is most convenient to employ three separate stations at each of which certain of the required operations are performed, these stations being designated herein as A, B, and C, and being indicated on the drawings by the reference lines A—A, B—B, and C—C, Figures 5, 6, and 7 showing the extent of the operation performed at these three stations respectively.

Thus at station A the wheel carrier and suspension link are mounted in proper operative relation with the axes of the adjacent bosses in substantial alignment. It will be observed that the bosses 31 and 32 in the link have previously been supplied with bushings 46. A washer 41 and a thrust bearing 42 are assembled in the positions shown, the several members of the joint are centered by means hereinafter described, and a pivot pin 40, having a fairly tight fit in the link boss 30, is driven in position. The pivot pin 40 is flattened at one side as indicated at 44 and a locking pin 43 inserted in an aperture 45 in the link 26 engages this flattened side to retain the pivot pin 40 against rotation and axial displacement, the insertion of the locking pin 43 being preferably effected manually.

When these operations have been completed at station A to the extent indicated in Figure 5, the elements being operated on are conveyed to station B. Here the anti-friction elements, preferably in the form of needle bearings 47, are fed into the link bosses 31 and 32 and around the opposite ends of the pivot pin 40 in direct engagement with the periphery of the latter and with the bushings 46. The parts now occupy the relative position indicated in Figure 6 of the drawings, and on completion of the operation the conveyor moves on to station C.

At station C hardened washers 48 engaging the ends of the needle bearings 47 are inserted and Welsh plugs 49 or similar closure members are introduced in recesses 51 in the ends of the bosses 31 and 32, these operations being preferably performed by hand. The plugs 49 are then spun in position by mechanism forming part of the assembly machine, the outer ends 50 of the plugs 49 being upset and pressed into the metal at the ends of the link bosses to lock the various elements of the joint against displacement. The completed joint as it appears after this last operation is shown in Figure 7, and the conveyor or carrier is now returned to the initial position for the removal of the assembled link and wheel carrier and the performance of further operations on another set of elements.

*The machine frame structure*

The machine is supported on legs 55 and a bed 56 on which are mounted spaced upright frame members 57 having oppositely directed lower legs 58, upper legs 59, and rear walls 60, the whole comprising two generally rectangular box-shaped structures each having two open sides.

Between these structures is supported a carriage for the elements which are operated upon, this carriage being displaceable in a vertical direction to the several stations hereinbefore indicated for the performance at each of these stations of certain operations. The carriage or conveyor may comprise an upright carriage member 62 which is supported for vertical movement in guide members 68 which are secured to the upright frame members 57. A generally horizontally extending carriage base member 63 is secured in any convenient manner to the member 62 and an inclined plate 64 is in turn secured to the member 63, for instance by welding. Secured to the plate 64 is a transverse link support 65 on which the inner ends of the link 25 may be mounted. A bracing plate 66 extends between the member 62 and the inclined plate 64 and is secured to both so as to provide with the side plates 67 a generally box-shaped structure supported from the member 62.

At either end of the transverse link support 65 are secured supporting plates 70, each of the latter being provided with a clamping device for the reception of the inner end of the suspension link. Thus each of these clamping devices comprises a depending bracket 71 in which is mounted a spindle 73 having thereon a lever arm 75, the spindle 73 being provided with an eccentric portion on which is journalled one leg of a generally yoke-shaped member 72. As shown more particularly in Figures 8, 9, and 11 each member 72 is provided beneath its upper leg with spaced bosses 77 and each supporting plate 70 is provided with cooperating bosses 76, the latter having formed thereon projections 79 which receive the apertures in the flattened ends 37 of the pivot pin 36 at the inner end of the suspension link 25. When the handle 75 is rotated in a clockwise direction as viewed in Figure 11, the flattened ends 37 of the link pivot pin are gripped between the bosses 77 and 76 to securely fasten the inner end of the link 25 in position.

Secured on or formed integrally with the carriage base member 63 is a boss 81 of generally hexagonal shape having two apertures therethrough as indicated at 82 and 83. The suspension links 25 at opposite sides of each frame are differently formed so that one of these links is received at its inner end in one of the clamps carried by the plate 65 and abuts one side of the hexagonal boss 81, whereas the other link is received in the other of the clamps and abuts the other side of the boss 81. The apertures 82 and 83 are adapted for the selective reception of a pin which passes through the upper of the apertures in the enlarged portion 35 of the link to secure the latter in position at station C, as hereinafter described.

The movable carriage affords a support for a pair of laterally movable elements 85 which slide on the base member 63 and which are keyed thereto as at 84, these elements having horizontal and upright portions. The lateral movement of these elements is controlled by an idler pinion 86 which meshes with teeth formed on each of these elements as shown in Figure 12, the pinion being carried on a pin 87 which is in turn supported in the carriage base member 63. An operating spindle 88 extends through the base of the hexagonal boss 81 and is journalled in a bearing member 90 which is secured to a bracket 91, the latter being mounted on the inclined plate 64 as shown in Figure 11. The spindle 88 carries an eccentric pin 92 which operates in a slot 93 formed in one of the elements 85. Thus when the handle 89 is rotated, the elements 85 are moved in opposite directions owing to the geared connection therebetween, so that the vertical portions thereof either approach or recede from each other.

The elements 85 are guided in their lateral movement by blocks 95 and 96 which are secured to the carriage base member 63 and a plate 97 is superimposed on the elements 85 and is secured to the blocks 95 and 96 so that the movement of the elements is definitely restricted. Each of the elements 85 is provided with a slot 98 having an elongated portion and terminating in an enlarged generally circular portion 99. A pair of plates 100 are provided, each of these plates having a dovetailed guide fit with the upright portion of one of the elements 85 for sliding movement therein as shown more particularly in Figure 10, each plate having a circular opening 101 therein. These plates are furthermore each apertured to snugly receive sleeves 103 which are extended through the slots 98 in the associated elements 85. Each of the plates 100 is furthermore provided with a handle 104 whereby the associated plate may be displaced toward the rear or toward the forward portion of the machine. Simultaneous forward and rearward movement of the plates 100 is ensured by means of brackets 107 which are secured to the respective plates and extend toward each other as shown in Figure 14, one of these brackets having a reduced portion 106 which is telescoped within a corresponding opening in the other bracket. Keys 108 are secured on the plate 97 and keys 109 are secured on a block 110, the latter being secured to the base member 63. These stationary keys define the positions of the plates 100 which permit movement of the elements 85 toward each other. For instance, when the plates 100 occupy their rearward position in which the sleeves 103 carried thereby are in alignment with the suspension link and wheel carrier bosses, the elements 85 may be moved toward each other by operation of the spindle 88 since the key-ways 105 formed in the flanged portions of the brackets 107 will then engage and slide on the keys 109. When the handles 104 are pulled forwardly to move the plates 100 to their extreme forward position in which the circular openings 101 are in alignment with the suspension link and wheel carrier bosses, the keyways 105 in the brackets 107 will then engage and slide on the keys 108. Displacement of the elements 85 toward each other at positions intermediate the extreme forward and extreme rearward positions is thus prevented by the keys 108 and 109.

It will be observed that when the plates 100 occupy the rearward position in which they are shown in Figures 10, 11, and 14, the elements 85 may be moved toward each other to engage the sleeves 103 in the bosses 31 and 32 respectively of the suspension link 25, the sleeves being dimensioned for reception in the bosses with a reasonably snug fit so as to prevent unintentional displacement of the link. The link is thus engaged by the sleeves 103 at stations A and B, so that the operations performed at these stations may be carried out by means passed through the sleeves 103 and thence into the link bosses. At station C, however, the elements 85 are retracted, and by means of the handles 104 the plates 100 are moved to their forward position in which the circular openings 101 in the plates are in alignment with the suspension link bosses, the operations at this station being carried out by means moving through the circular opening 101 and the aligned circular portions 99 of the slots 93 formed in the elements 85.

Secured to the upright carriage member 62 is a bracket 111 in the form of a generally vertically disposed plate, the bracket 111 having formed thereon a fin 112 which projects forwardly and which serves as a support for an arm 113. At the outer end of the arm 113 is secured a boss 114 through which passes a pin 115 for engagement with the boss 29 at the upper end of the wheel carrier to retain the latter in position.

Secured at the rear of the frame of the machine and extending transversely thereof is a supporting plate 116 on which is mounted an arm 117 carrying a pulley 118. A cable 119 passes over the pulley and is secured at its opposite ends to a piston rod 120 and to the movable carriage as indicated at 121, reference being had to Figure 3 of the drawings. The piston rod 120 is connected to a piston (not shown) which is reciprocable within a vertically arranged cylinder 122. Thus by the admission of fluid under pressure to opposite ends of the cylinder 122, in a manner more particularly hereinafter set forth, the carriage may be displaced vertically from one to another of the several stations at which operations are performed.

Mechanism for inserting the pivot pin

The mechanism for inserting the pivot pin at station A includes a supporting bracket 125 which is bolted to the right-hand upright frame member 57. Secured by bolting or otherwise to the supporting bracket 125 is a cylinder 126 in which moves a piston (not shown), of which the piston rod 127 projects through the open end of the cylinder. Secured to the frame member 57 is a pivot pin guide 128, the latter being cut away at its right-hand end as shown more particularly in Figure 10, and being provided with a spring 129 of which the free end is disposed in the cut-away portion 130 of the guide. This guide is adapted to receive a pivot pin 40 and the spring 129 is arranged to engage the flattened portion 44 of the pivot pin so as to retain the latter in proper position when the pin is inserted in the guide as illustrated in Figure 10. As hereinafter explained, the piston rod 127 is arranged to force the pivot pin 40 through the aligned bosses on the supporting link and wheel carrier.

Secured to the left-hand frame member 57 is a supporting bracket 133 in which is carried for sliding movement a rod 134 which serves as an abutment while the pivot pin 40 is being pressed in position. The rod 134 is retained against rotation by means of a key 135 sliding in a key-way formed in the bracket 133 and is formed with a toothed portion with which a pinion 136 meshes, the pinion 136 being secured on a shaft 137 to which a lever 138 is in turn secured. Thus when the lever 138 is rotated in a clockwise direction, the rod 134 is displaced to the right as viewed in Figure 14 into abutting relation with the adjacent element 85. Any convenient means may be provided for locking the lever 138 to prevent unintentional displacement of the rod 134 from element abutting position.

The rod 134 is apertured as shown in Figure 14 to receive a second rod 139, the latter having a toothed portion 140 with which a pinion 141 meshes, the latter being mounted on a shaft 142 to which is secured a hand wheel 143. Thus on rotation of the hand wheel in a clockwise direction, the rod 139 is displaced to the right. The right-hand end of this rod is tapered slightly and is arranged, on rotation of the hand wheel 143, to pass through the aligned bosses on the suspension link and the wheel carrier to effectively center the same prior to the operation of pressing the pivot pin in place.

The operation at station A is substantially as follows. With the suspension link and wheel carrier supported in a manner hereinbefore indicated, and with the sleeves 103 engaged within the link bosses, the handle 138 is rotated in a clockwise direction to engage the abutment rod 134 with the adjacent element 85; the hand wheel 143 is then rotated in a clockwise direction to displace the centering rod 139 to the right. As the rod is moved to the right through the suspension link and wheel carrier bosses, the washer 41 and the thrust bearing 42 are held in the position shown in Figure 5 so that the centering rod may move through them. The pivot pin 40 is placed in position in the guide 128 and when the rod 139 has been displaced to the position in which it is shown in Figure 10, the parts are accurately centered and the pivot pin 40 may be thrust in position. For simplicity of illustration, the link bosses are not illustrated in Figure 10.

The displacement of the pivot pin 40 is effected by means of the piston rod 127, the latter being moved to the left by the introduction of air in the head end of the cylinder 126 by control devices hereinafter described. As the stem 127 moves into engagement with the pivot pin 40 and forces the latter through the link and wheel carrier bosses, the centering rod 139 is displaced to the left by the pin, the parts thus moved eventually reaching a position slightly beyond that in which they are shown in Figure 14, with the pivot pin located within the bosses. The hand wheel 143 is now rotated in a counterclockwise direction to withdraw the centering rod 139, upward movement of the carriage being prevented by means hereinafter more fully described, and including a valve 145 carried by a bracket 144 arranged for actuation by the rod, until this rod is entirely withdrawn. The parts which are to be assembled have now assumed the position in which they are shown in Figure 5 of the drawings, and the locking pin 43 may be driven in position to retain the pivot pin 40 against displacement, this driving of the locking pin being preferably effected manually. The carriage is now moved up to station B for the feeding of the needle bearings into position around the pivot pin 40.

Mechanism for feeding the anti-friction bearings

The apparatus for feeding the needle bearings is not in itself broadly new, and may assume various forms other than that illustrated herein. In apparatus of the type shown in the accompanying drawings, the needle bearings 47 are placed in hoppers 150 at the upper end of and on either side of the machine, the bearings being thence delivered to drums 156 within casings 151, the drums being rotated through sprocket gearing 152 from a shaft 153 driven by a motor 154. Preferably a friction drive device is introduced in the driving train between the motor and the drums, one form of friction clutch 157 being shown in Figure 27 between the drum shaft and the sprocket gear 159. Each drum 156 is constructed to afford adjacent the peripheral portion thereof a plurality of elongated apertures 158 in which individual needle bearings may be received as the drum is rotated, the bearings being thus conveyed upwardly. The casing 151 comprises a peripheral portion 160 having an opening 161 therein, this opening permitting the ejection of individual needle bearings therethrough as the latter are delivered from the apertures 153 in the drum. The removal of bearings from these apertures is facilitated by a spring 162 which is secured to the frame of the machine and which engages the bearings as they are rotated to the discharging position to eject them from the drum.

Each bearing as it is ejected is received in a slot 163 formed between members 164, the latter delivering the bearings to slotted guides 167 which in turn feed the bearings to openings 169 in bosses 184 formed integrally with sleeves 170.

Each sleeve 170 is secured in the adjacent upright member 57 of the machine frame, for instance by reception with a tight fit in a housing 171, the latter being bolted to the machine frame. Slidably supported within each sleeve 170 is a sleeve 172 provided with rack teeth 175 meshing with a pinion 173 secured to a shaft 174. The shaft 174 extends transversely of the housing 171 and is journalled for rotation therein. A pinion 176 is carried on the shaft 174, this pinion meshing with a rack member 178 which is in turn secured to and actuated by a piston rod 179. The piston rod 179 extends within a cylinder 180 and is reciprocated by a piston (not shown) therein. It will thus be observed that by admission of working fluid to either end of the cylinder 180, the sleeves 172 may be displaced to the left or to the right, Figures 16 and 17 showing the sleeve in two different positions.

Each sleeve 172 is threaded as indicated at 185 to a sleeve 186 of less diameter and a shaft 188 extends through the sleeves 172 and 186 and is slidable therein. The forward end of each sleeve 186 is also slidable in the associated boss 184 and the sleeve 172 which moves therewith is retained in its extreme outward position by means of a spring pressed detent 189 supported in the housing 171 and engaging a notch 191 in the sleeve. A coil spring 190 surrounds the shaft 188 and acts between a flange 193 on the shaft and a collar 194, the latter being pinned to the sleeve 172 as indicated at 195 in Figure 19. It will thus be observed that as each sleeve 172 is displaced inwardly toward the central portion of the machine, that is to say toward the suspension link bosses, the associated shaft 188 will be urged in the same direction by means of the coil spring 190. When the sleeves 172 are withdrawn, the associated shafts 188 will be constrained to follow by reason of the engagement with a collar 196 secured to each shaft 188, of a washer or the like 197 which is pressed within the outer end of the associated sleeve 172. Each of the shafts 188 is provided with means for rotating the same which may comprise a pulley 198 having a splined connection with the shaft so as to permit the latter to move axially within the pulley, the pulley being held against axial displacement by the arms of a yoke-shaped bracket 199 which may be formed integrally with the housing 171.

Each pulley 198 is rotated by means of a belt 202 which extends about one of a pair of driving pulleys 204, the latter being secured on the transversely extending shaft 153 which, as has been hereinbefore described, is driven from a motor 154, the latter serving also to drive the drums 156 which feed the needle bearings to the guides 167.

The operation of the structure thus far described will now be apparent. Figure 16 shows the position occupied by the parts immediately prior to the initiation of operations at station B. The suspension link and wheel carrier are supported on the moving carriage in the same manner as at station A and the upward movement of the carriage has been terminated with the suspension link bosses 31 and 32 and the sleeves 103 in axial alignment with the bosses 184. Needle bearings 47 surround the shafts 188 within the bosses 184 and are thus ready for insertion in the bosses, the bearings being received about the forward portion of the shaft 188. On the arrival of the carriage at station B, operation of the motor 154 is initiated by means hereinafter described and the shafts 188 are rotated during the feeding of the needle bearings into the bosses in order to facilitate the operation. The arrival of the carriage at station B also sets in operation the mechanism which admits air under pressure to cylinders 180, and the piston rods 179 and rack members 178 are moved forwardly with the result that the sleeves 172 are positively displaced toward the suspension link bosses and the shafts 188 are yieldingly carried therewith through the medium of the springs 190. Thus the needle bearings 47 are moved out of the bosses 184 and into and through the sleeves 103, displacement of the sleeves 186 continuing until the needle bearings are fully seated within the suspension link bosses 31 and 32 and about the pivot pin 36. During this operation, and before the needle bearings have been displaced from about the shafts 188, the latter have moved into engagement with the opposite ends of the pivot pin 36 and the needle bearings are thus properly guided into position about the pivot pin, the springs 190 yielding during further movement of the sleeves 172. On completion of the operation of inserting the needle bearings, the parts will occupy approximately the position in which they are shown in Figure 17.

Air under pressure is now admitted to the opposite end of the cylinders 180 with the result that the operation is reversed, the sleeves 172 and 186 being positively withdrawn and, by reason of the engagement of the washers 197 and collars 196, withdrawing the shafts 188, the position in which the parts are shown in Figure 16 being eventually resumed, whereby the introduction of fresh needle bearings through the slots 169 in the bosses 184 takes place. On completion of the operation of feeding in the bearings at station B, the carriage is automatically displaced to station C, preferably by automatic means of the nature hereinafter described.

*Mechanism for locking the anti-friction bearings in assembled relation*

When the carriage arrives at station C, the operator inserts a pin through the upper of the apertures in the enlarged portion 35 of the suspension link 25 to secure the latter in position, this pin extending through the hexagonal boss 81 supported on the carriage base member 63 as hereinbefore explained. The pin is preferably constructed as indicated in Figures 23 and 24 and comprises a cylindrical body portion 207 extending through the boss and the link, a reduced portion 208 which is adapted to receive a lock washer 209, and a handle portion 210 which may be secured to the body of the pin in any convenient manner. Thus the pin may be readily thrust in position and locked by the washer 209 against unintentional displacement. The operator may now rotate the handle 89 to displace the elements 85 and to withdraw the sleeves 103 from within the suspension link bosses. He then displaces the plates 100 forwardly to align the openings 101 therein with the link bosses. The hardened washers 48 and the Welsh plugs 49 are now introduced in the link bosses 31 and 32 by hand, the operator releasing the pin 115 from the upper wheel carrier boss 29, if necessary, so that the wheel carrier may be swung out of the way to render the link bosses more readily accessible for the insertion of these elements. When the parts have been made ready for the operation of spinning in the Welsh plugs, the mechanism illustrated more particularly in Figures 29 to 32 inclusive is set in motion.

This mechanism comprises spinning elements arranged to simultaneously engage the plugs and the ends of the bosses from opposite sides, only the unit at the left-hand side of the machine being shown in detail in Figures 29 to 32, it being understood that the two units are preferably identical as indicated in the remaining figures in which they are illustrated. Each unit of the mechanism, which is supported in any convenient manner on the adjacent upper leg 59 of the machine frame, comprises a cylinder 215 having a piston therein which serves to actuate a piston rod 216 in opposite directions transversely of the machine. Secured to the rod 216 is a yoke 217 which serves to connect the rod to a shaft 218. Surrounding the shaft 218 and movable therewith is a bracket 220 which is slidable in stationary dovetailed guides 221 formed in a bracket 223 secured to the machine frame, the bracket 220 serving as a support for a motor 222, the latter having a generally vertical axis, and the bracket 223 serving as a support for the cylinder 215. Carried on the motor shaft 225 is a worm 226 meshing with a worm wheel 227, the latter being secured to a sleeve 228 which surrounds the shaft 218 and is journalled as indicated at 229 in the bracket 220. At its outer end the sleeve 228 is provided with a flanged portion 232 to which is attached the flanged portion of a sleeve 235, the latter surrounding the shaft 218 and having an annular groove 236 formed in the periphery thereof. A sleeve 238 is provided with a plurality of apertures 239 spaced circumferentially thereof, these apertures receiving pins 240 which project into the annular groove 236 and which are retained in position by a band 241 encircling the sleeve 238. The sleeve 238 is also apertured at a plurality of circumferentially spaced points to receive the stem portions 243 of spinning elements 244 which are thus supported for rotation on axes substantially intersecting the axis of the shaft 218. Each of these spinning elements is provided with a head having a bevelled side which is arranged to engage a corresponding bevelled surface 246 on the outer end of the sleeve 235 and which is adapted to engage the outer ends of the suspension link bosses and the Welsh plugs when displaced into engagement therewith by operation of the piston rod 216.

The yoke 217 is locked against rotation, for instance by bolting the annular flange 248 thereof to the bracket 220. Thus as the sleeves 228 are rotated while the spinning elements 244 are in engagement with the link bosses and the Welsh plugs, each sleeve 238 being free to rotate will function as a planet carrier, revolving about the axis of the shaft 218 at a slower rate of speed than that of the sleeve 235 by reason of the engagement of the spinning elements 244 with both the rotating sleeve and the stationary link boss. In this manner adequate pressure can be applied to the bosses and plugs by the spinning elements without the development of excessive friction, the spinning elements rolling on the driving sleeve 235 and on the link bosses.

Engagement of the spinning elements with the link bosses is of course effected by displacement of the brackets 220 at either side of the machine toward the bosses from the position shown in Figure 29 on admission of air to the cylinders 215, the motors 222 being simultaneously energized so that the spinning elements are rotated on their own axes and revolved as just explained. Preferably, the arrangement is such that after initiation of the operation, the spinning elements and associated parts are displaced to operative position, are rotated for a predetermined period of time, and are then automatically withdrawn. When the initial inoperative position is again reached, fluid under pressure is automatically admitted to the lower end of the main cylinder 122 with the result that the carriage is returned to station A for removal of the completely assembled suspension link and wheel supporting member, these operations being carried out without attention on the part of the operator once the spinning mechanism is started.

Control mechanism

As hereinbefore indicated, it is intended that the operation of the machine as a whole be largely automatic, but preferably the arrangement is such as to permit of supervision and direct control by an operator of certain operations. Suitable control mechanism is indicated in Figure 33 of the drawings, diagrammatic illustration of this mechanism being essential in order that the same may be readily understood. It will be observed, however, that in general the various parts of the machine have been represented in Figure 33 in much the same manner as in the other figures and similar reference numerals have been applied to corresponding elements.

It has already been explained that the movable carriage is displaced upwardly or downwardly by admission of air to the upper and lower ends respectively of a cylinder 122 to which the carriage is connected by means of a cable 119 which passes over a pulley 118 and is secured at its opposite ends to the piston rod 120 operable by the cylinder 122 and to the carriage. In order to definitely limit the upward movement of the carriage at each of the three stations to ensure proper alignment of the link and wheel carrier bosses with the operating mechanism at each station, a rack member 250 is secured to the rear of the carriage and depends therefrom as indicated in Figure 3, this rack member extending downwardly through an opening in the machine bed 56 and having recesses therein with which an automatically controlled pawl may cooperate to accurately control the carriage movement, the details of this arrangement being shown in Figure 15. Thus the rack member 250 may be provided with three recesses 252, 253, and 254, these recesses being successively engaged by a pawl 255 at the respective stations A, B, and C. Associated with each of the recesses in the rack member is a hardened block 256, the upper face of which directly contacts with the pawl to limit the upward movement of the rack member. The pawl is supported for sliding movement in a bracket 258, the latter embracing and constituting a guide for the rack member 250, and is yieldingly urged toward the rack member by a coil spring 259. One arm of a bellcrank lever 262 is arranged to engage a shoulder 263 on the pawl stem 264, the other arm of the lever being positioned in the path of movement of an abutment 265 on the stem 266 of a piston (not shown) operating in a cylinder 268, the stem extending through the piston and protruding from the opposite end of the cylinder as at 267 for engagement at the lower limit of movement of the piston with the stem 269 of a valve 270. The cylinder 268 and valve 270 may be supported on a bracket 271 depending from the machine bed 56.

When the carriage is to be moved upwardly, for instance from station A to station B, air under pressure is admitted to the upper end of the cylinder 122 and to the upper end of the cylinder 268, the piston within the latter cylinder operating to withdraw the pawl 255 from the recess 252 in the rack member 250, permitting the rack member and the carriage to move upwardly. The piston stem 266 rapidly completes its downward stroke and the protruding portion 267 thereof engages the valve stem 269, the valve 270 then functioning to reverse the air control for cylinder 268 so that air under pressure is admitted to the lower end thereof and the stem 266 is returned to the position shown in Figure 15, permitting the spring 259 to urge the pawl 255 against the rack member so that the pawl may seat in the following recess 253 when the carriage has moved upwardly to that extent, the carriage stopping precisely at the position required to carry out the operations at station B. Similar operation occurs during movement of the carriage from station B to station C, and in moving from one station to another control is effected of the air discharged from the lower end of the cylinder 122 in such manner that this air acts as a cushion to prevent unnecessarily rapid upward movement of the carriage and possible damage to the rack member 250 and pawl 255. For instance, the arrangement is preferably such that air under pressure is admitted at all times to the upper end of the cylinder 122 once upward movement of the carriage from station A is initiated, so that the full air pressure will be established in the upper portion of the cylinder 122. Throttling of the flow of air into the upper portion of the cylinder would therefore probably not be sufficient to retard upward movement of the carriage to any considerable extent. It is therefore proposed to prevent discharge of air from the lower end of the cylinder 122 until the carriage has nearly reached the next succeeding station, the air thus trapped forming a cushion. When the next succeeding station is nearly reached, this trapped air is permitted to discharge so that final movement of the carriage to the desired station may be rapidly completed. One mode of carrying out this desired series of operations is illustrated in Figure 33 of the drawing to which reference is now made.

Associated with the cylinder 122 is an automatic valve 275, for instance of the character shown in Figure 34, which is constructed so as to admit air under pressure to either end of the cylinder when either of two corresponding control ports opening into the valve are vented. Thus air under pressure which flows throughout the control system through pressure conduits which are for convenience designated P and which are preferably connected to a common source of compressed air, is admitted to the valve 275. From the valve 275 a pressure line 276 leads to the upper end of the cylinder 122 and a pressure line 277 leads to the lower end of the cylinder. A control line 279, communicating with a control port in the valve 275 leads to a control valve 280 which may be manually operated to vent the control line 279, the venting of this line effecting automatic displacement of the valve 275 to admit air under pressure to the pressure line 276 and thence to the upper end of the cylinder, tending to move the carriage upwardly. A second control line 282 communicating with a control port in the valve 275, is connected to a control valve 283 located at station C, operation of valve 283 serving to vent the control line 282 and thereby effect automatic displacement of the valve 275 to supply air under pressure to the pressure line 277 and thence to the lower end of the cylinder 122 to return the carriage to station A.

Communicating with the control line 279 is a second control line 284 which communicates with an automatic valve 285, similar to the valve 275, and associated with the cylinder 268 which is effective to operate the pawl 255. A second control line 286 communicates with the valve 285 and with the control valve 270, the latter being operable by the piston in the cylinder 268 as hereinbefore explained. A pressure line 289 communicates with the upper end of the cylinder 268 and a pressure line 290 communicates with the lower end of the cylinder 268, these pressure lines being supplied from the valve 285. Thus when the valve 280 is opened to vent the control line 279, the control line 284 is also vented, and the valve 285 is automatically operated to deliver air under pressure to the pressure line 289 and thence to the upper end of the cylinder 268, whereby the pawl 255 is withdrawn from the recess in the rack member 250. As the piston within the cylinder 268 moves downwardly, the valve 270 is opened by the protruding portion 267 of the piston stem, whereby the control line 286 is vented, and the valve 285 is automatically operated to admit air under pressure to the pressure line 290 and thence to the lower end of the cylinder 268 to restore the pawl 255 to engagement with the rack member for reception in the next lower recess in the latter. It will thus be observed that on operation of the valve 280 to vent the line 279, this operation being preferably effected manually, the carriage is moved up to the next station by the admission of air under pressure to the upper end of the cylinder 122 and by the automatic manipulation of the pawl 255 as explained. Thus in order to raise the carriage from one station to another, it is only necessary to operate the valve 280 or some other valve which is connected with the control line 279 to vent the latter.

As hereinbefore stated, it is desirable to prevent movement of the carriage from station A to station B until the centering rod 139 is completely withdrawn from engagement with the elements movable with the carriage, and a valve 145 is provided for engagement by the centering rod when the latter is returned to its inoperative position, this valve being arranged to vent a control line 292 which communicates with the control line 286 associated with the valve 285. The arrangement is such that the valve 145 is closed only when the centering rod 139 occupies its extreme left-hand position, movement of the rod away from the valve serving to vent the control line 292. As long as this control line is vented, the venting of the control line 284 which is also connected with the valve 285 will not effect displacement of the latter since there will be no unbalanced pressure. Thus it is possible to admit air under pressure to the upper end of the cylinder 268 to withdraw the pawl 255 from the rack member 250 only when the centering rod is entirely withdrawn and is in engagement with the operating member of the valve 145 to close the line 292.

For the operation of the piston rod 127 an automatic valve 295 similar to the valves 275 and 285 is provided, this valve being supplied with air under pressure and communicating with the outer end and the inner end respectively of the cylinder 126 by means of pressure lines 296 and 297. A control line 298 communicates with the valve 295 and with a control valve 300 which may be manually operated to vent the line and thereby displace the valve 295 to admit air under pressure to the pressure line 296 and thence to the outer end of the cylinder to displace the piston rod 127 to the left. A valve 302 which is supported in a fixed position for engagement by an abutment 304 carried by the outer end of the piston rod 127 serves to vent the control line 303 when the piston rod 127 has reached its extreme left-hand position, the piston pin having been thrust entirely into the link and wheel carrier bosses. The venting of the control line 303, which communicates with the automatic valve 295, effects displacement of the latter to admit air under pressure to the pressure line 297 and thence to the inner end of the cylinder 126 to effect withdrawal of the piston rod 127.

The sequence of operations thus far described may be summarized as follows. The operator having assembled the suspension link and the wheel carrier in position on the movable carriage of the machine, and having inserted the pivot pin in position in the guide 128, and positioned the abutment 134 and centering rod 139, operates the valve 300 with the result that the pivot pin is forced in position by the piston rod 127, the piston rod returning on completion of its operative stroke. The operator now inserts the locking pin 43 in the wheel carrier, withdraws the centering rod 139, and operates valve 280 which releases pawl 255 from rack member 250 and admits air to the upper end of cylinder 122, with the result that the carriage moves upwardly. During the remainder of the operations and until the completion of work at station C, the automatic valve 275 is not further displaced and air under pressure is continually present in the upper end of the cylinder 122.

As hereinbefore indicated, it is desirable to control the venting of air from the lower end of the cylinder 122. For this purpose a pipe 308 may communicate with the lower end of the cylinder and with a valve 310 which is of an automatic type, but which is preferably somewhat different from the automatic valves hereinbefore referred to and may be constructed as shown in Figure 35. Associated with the valve 310 is a single control line 311, on the venting of which the valve 310 is displaced so as to afford communication between the pipe 308 and an exhaust pipe 312 which discharges to the atmosphere. When the control line 311 is closed, the valve 310 is displaced to an operative position in which the pipe 308 is blocked and further discharge of air from the lower end of the cylinder 122 is prevented. The control line 311 communicates with each of two valves 314 and 315 which are positioned for engagement by a pawl 316, supported at any convenient point on the movable carriage, and arranged to actuate these valves shortly before the carriage moves into final position at the respective stations with which they are associated. In other words, before the carriage arrives at station B, pawl 316 will engage the stem of valve 314 to vent control line 311, and valve 315 will be similarly actuated just before the carriage moves into final position at station C. The pawl 316 is supported for free swinging movement upwardly, so that on return movement of the carriage the valves 314 and 315 are not affected.

It will thus be appreciated that as the carriage moves in an upward direction, the momentum of the carriage is gradually retarded by the compression of air in the lower end of the cylinder 122. Immediately before the following station is reached, the valve 310 will be actuated to vent the lower end of the cylinder 122, and the carriage is thereupon permitted to resume its movement unchecked, being positively stopped at the station in the proper position by the action of the pawl 255. After each displacement of the valve 310 to a position to open communication between the pipe 308 and exhaust pipe 312, the valve is slowly displaced in the opposite direction to close the pipe 308 so as to be in readiness for the next successive upward movement of the carriage.

As the carriage reaches station B, the pawl 316 engages the stem of a control valve 318, this valve communicating with a control line 319 which in turn communicates with control lines 321 and 322, the latter being connected with control ports in automatic valves 325 and 326 respectively. The valves 325 and 326 may be similar to valves 275, 285, and 295 hereinbefore described. Thus the valve 325 is supplied with air under pressure and communicates with the upper and lower ends of the left-hand cylinder 180 through pressure lines 328 and 329 respectively, and the valve 326 communicates with the upper and lower ends of the right-hand cylinder 180 through pressure lines 331 and 332 respectively. A control line 334 communicates with a valve 336 and with the opposite control port of the valve 325 and a control line 337 communicates with a valve 338 and with the opposite control port of the valve 326. The valve 336 at the left side of the machine is arranged for engagement with an abutment 340 carried by sleeve 172 which is displaced by the adjacent piston rod 179, attention being directed to Figures 16 and 17. Similarly the valve 338 is positioned for engagement with an abutment 341 carried by the sleeve 172 at the right side of the machine when this sleeve reaches the inner limit of its movement. The abutment 340 carries a pawl 343 which is arranged to engage and operate the stem of a control valve 344 as the adjacent sleeve 172 reaches its outward limit of movement only, the pawl 343 swinging into inoperative position on passing the valve during movement of the sleeve toward the adjacent link boss. The control valve 344 communicates with a control line 346, the latter in turn communicating with control line 284 which is associated with a control port in the automatic valve 285. The operation of the machine at station B is substantially as follows:

As the carriage moves into position at station B the control valve 318 is actuated by the carriage pawl 316 to vent control lines 319, 321, and 322. This results in displacement of automatic valves 325 and 326 to admit air under pressure to the upper ends of both cylinders 180, with the result that the piston rods 179 associated therewith are moved forwardly and the feeding in of the needle bearings in the manner hereinbefore explained is initiated. As the inwardly moving parts complete the feeding of the needle bearings, the control valves 336 and 338 are actuated to vent the control lines 334 and 337 respectively. This results in displacement of the automatic valves 325 and 326 to admit air under pressure to the lower ends of both cylinders 180 so that the piston rods 179 are moved backwardly to withdraw the bearing-feeding elements. The provision of separate valves 336 and 338 ensures that the feeding is completed at both sides of the machine prior to reversal of the supply of air under pressure to the respective cylinders 180.

As the sleeve 172 at the left side of the machine reaches its limit of outward movement, the pawl 343 actuates the control valve 344 to vent the control line 346, with the result that the automatic valve 285 is displaced to admit air under pressure to the upper end of cylinder 268 so that the pawl 255 is withdrawn from the rack member 250 and the carriage moves upwardly to station C, cushioning of the carriage movement being established and released by the actuation of the control valve 315 through the carriage pawl 316 as hereinbefore explained.

Under ordinary conditions the needle bearing feeding elements at the right hand side of the machine are completely withdrawn from the path of movement of the carriage before the latter is displaced from station B. It will nevertheless be appreciated that precautions may be taken to ensure such withdrawal prior to upward movement of the carriage. For instance in lieu of simultaneous feeding of the needle bearings at opposite sides of the machine as just described, the needle bearings may be fed in at opposite sides in succession, feeding at one side being completed before feeding at the other side is initiated. For example, the control line 321 may be omitted, and the associated control port of the valve 326 may be connected to the control valve 344. The control line 346 communicating with the automatic valve 285 may then be associated with a control valve positioned for actuation on the return of the needle bearing feeding elements at the right hand side of the machine. Thus the feeding of bearings at the left side will be first completed, the feeding of bearings at the right side thereafter initiated, and the carriage moved upwardly on termination of the feeding operations at the right side. Various other modifications will readily occur to one skilled in the art, but the arrangement is preferably such that the operation is entirely automatic once movement of the carriage from station A has been initiated until the carriage is moved into position at station C.

As hereinbefore explained, the shafts 188 on which the needle bearings are supported during feeding thereof into the suspension link bosses are preferably rotated during the operation, the rotation of the shafts at opposite sides of the machine being effected by an electric motor 154. The energization of this motor may be manually controlled, but control is preferably effected automatically. For instance, an abutment 347 carried by the bearing-feeding sleeve 172 at one side of the machine may be arranged for engagement with the movable element of an electric switch 348 when the sleeve reaches its outward limit of movement, the switch being constructed to then open a circuit including motor 154 and, in series therewith, a source 349 of electric energy. As the sleeve 172 is displaced inwardly to feed in the needle bearings, the switch 347 is closed and the circuit is completed until the feeding of the bearings is terminated when the switch is again opened to discontinue operation of the motor 154. In order to ensure that needle bearings are fed within the bosses 184 so as to completely surround the shafts 188 after the latter have been returned to their outward limiting position, the switch 347 may serve to control the operation of a second time delayed switch which in turn controls the motor circuit, whereby the motor may be rotated for a short period of time after termination of the bearing feeding operation.

On arrival of the carriage at station C, the operator inserts the hardened washers 48 and the Welsh plugs 49 in the manner hereinbefore explained, and operates the control valve 351, the latter being connected through a control line 352 with an automatic valve 355 of the type shown in Figure 34. A second control line 356 communicates with the valve 355 and with a control valve 357. The valve 355 communicates with the outer and inner ends respectively of the left hand cylinder 215 through pressure lines 359 and 360 respectively and with the outer and inner ends of the right hand cylinder 215 through pressure lines 362 and 363 respectively. The pressure line 359 communicates with the left hand end of a cylinder 364 through a pressure line 366, a control valve 367, normally closed, being interposed in series in the pressure line 366. The pressure line 360 communicates with the right hand end of cylinder 364 through a pressure line 369. Admission of air under pressure to the left hand end of cylinder 364 is preferably effected slowly, for instance by restriction of the pressure line 366, so that the piston rod 365, operable by a piston within the cylinder 364, is displaced at a measured and retarded rate to the right, the arrangement thus functioning as a timing device. The stem of the control valve 357 is positioned for engagement and actuation by the piston rod 365 when the latter reaches its outer limit of movement.

The stem of the valve 367 is arranged for actuation by an abutment 369, which may be carried by the outer end of the piston rod 216 associated with the left hand cylinder 215, when the rod reaches its limit of inward movement. A pawl 372 carried by the abutment 369 is arranged to engage and actuate, on outward movement only of the piston rod 216, the stem of the valve 283, the pawl 372 swinging into an inoperative position on engagement with the valve stem during inward movement of the piston rod.

An abutment 373 carried by the same piston rod is arranged to actuate the movable element of an electric switch 374, the latter being positioned in series in a circuit including a source of electric energy 375 in which the motors 222 are arranged in parallel. The switch 374 is so constructed that when the piston rod 216 occupies its outward limit of movement, the circuit is opened but while the rod is displaced from this position and during the operation of spinning, the circuit is closed so that the motors 222 are energized. The operation at station C is substantially as follows:

Upon operation of the control valve 351 by the operator, the control line 352 is vented and the valve 355 is displaced to admit air under pressure to the outer ends of both cylinders 215, with the result that the spinning elements shown more particularly in Figures 29 to 32, inclusive, are moved toward engagement with the link bosses and the Welsh plugs. On initiation of this movement the circuit including the motors 222 is closed by the switch 374 so that the spinning elements are rotated. When these elements reach the spinning position, the control valve 367 is operated to afford communication between the pressure line 359 and the left-hand end of the cylinder 364, effecting gradual displacement of the piston 365 toward the stem of the valve 357. After the spinning has been continued for a predetermined period of time, which may be controlled by throttling the pressure line 366, the valve 357 is operated to vent the control line 356 and effect displacement of the automatic valve 355 to admit air under pressure to the inner ends of both cylinders 215, whereby the pistons 216 and the spinning elements associated therewith are withdrawn. On the completion of the outward stroke of the pistons 216, the switch 374 is opened to discontinue operation of the motors 222 and the valve 283 is operated by the pawl 372 to vent the control line 282, whereby the automatic valve 275 is displaced to admit air to the lower end of the cylinder 122 and thereby return the carriage to the lower position at station A. Here the assembled suspension link and wheel carrier may be removed and new elements introduced in position for repetition of the machine operations.

The details of the automatic valve employed in Figure 33 form no part of the present invention and may be of any conventional type. For instance, a construction such as shown in Figure 34 may be employed at any point in the system where it is desired to admit air to either end of a cylinder at will by the venting of either of two control lines, the cylinder 122 being represented for the purpose of illustration. The valve indicated generally at 275 may be connected for selective communication with the upper and lower ends of the cylinder respectively through the pressure lines 276 and 277, air under pressure being introduced to the valve through the conduit P. The control line 279 affords communication between one end of the valve 275 and the control valve 280, and the control line 282 affords communication between the opposite end of the valve and the control valve 283. The pressure conduit P communicates with a central chamber 378 of the valve intermediate the unitary pistons 379 and 380, the latter operating respectively in cylinders 382 and 383 with which the control lines 279 and 282 are in respective communication. Carried with the pistons is a valve member 386 which is arranged to afford communication between the chamber 378 and either of the pressure lines 276 and 277. The interiors of the pistons 379 and 380 are in communication with the cylinders 382 and 383 through restricted openings 388 and 389 respectively and in direct communication with the chamber 378 and pressure conduit P through the opening 390.

Assuming that the control lines 279 and 282 are closed, it will be observed that equal pressure is developed in the cylinders 382 and 383, air under pressure flowing into these cylinders through the openings 388 and 389 in the respective pistons. The valve member 386 occupies a position in which communication is afforded between the pressure conduit P and the pressure line 277, whereby air is admitted under pressure to the lower end of the cylinder 122. If the valve 280 be operated to vent the control line 279, the pressure in cylinder 382 will immediately be reduced and the excess pressure in cylinder 383 will cause the pistons 379 and 380 to move upwardly, whereby the valve member 386 will be displaced to a position in which the pressure conduit P is in communication with the pressure line 276, and air is thus admitted to the upper end of the cylinder 122, tending to displace the piston therein downwardly. When this position of the parts has been reached, it will be apparent that venting of the control line 282 by operation of the valve 283 will effect displacement of the pistons 379 and 380 in the opposite direction to admit air under pressure to pressure line 277 and thence to the lower end of cylinder 122. The weight of the movable parts of the valve 275 may be counterbalanced, for instance by the employment of a light spring, or the valve may be arranged in a horizontal position so that no counterbalancing is required.

The valve shown in Figure 35 is essentially similar but is arranged to exhaust air from one end only of a cylinder, as is required of the valve 310 shown in Figure 33 of the drawing, reference characters similar to those employed in Figure 34 being used to designate corresponding elements. Thus only one discharge port is provided, this port communicating with an exhaust pipe 312. A light coil spring 392 is disposed in the cylinder 382 to urge the pistons downwardly or to a position in which the exhaust pipe 312 is closed. The valve is supplied with air under pressure through the pipe 308 leading from the lower end of the cylinder 122. The cylinder 382 of the valve 310 may be opened to the atmosphere by the actuation of valve 314 which vents the control line 311.

Thus when the valve 314 is actuated, the pressure in cylinder 382 is immediately reduced and the pressure in cylinder 383, supplied from the lower end of cylinder 122 as the result of the downward movement of the piston therein, causes the valve pistons 379 and 380 to move upward against the action of the light spring 392, whereby communication is established between the discharge pipe 308 and the exhaust pipe 312, and the pressure in the lower end of the cylinder 122 is promptly relieved to a considerable extent to permit the carriage to proceed to the next station as hereinbefore explained. By the action of the spring 392, the pistons 379 and 380 are moved downward at a fairly slow rate, the air forced out of the cylinder 383 being required to pass through the restricted opening 389. It will thus be observed that the venting of the lower end of the cylinder 122 is continued for a sufficient period of time to permit of actuation of the carriage in the desired manner, the automatic control valve 310 being gradually reset in readiness for the next succeeding operation thereof upon actuation of the valve 315 adjacent station C.

It will be obvious that electrical actuation of the various control valves may be relied upon in lieu of the pneumatic control thereof as described herein and, if desired, various other pneumatically operated devices forming essential parts of the machine may be replaced by electrically operated devices. The construction illustrated in the drawings is preferred, however, for its low cost and simplicity and effectiveness of operation.

Having thus described the invention, what is claimed as new and desired to be secured by Letters Patent is:

1. In apparatus for assembling a pivotal connection between two apertured elements, the combination with means supporting said elements with the apertures thereof in alignment, means for inserting a pivot pin in the aligned apertures at one station, means for associating anti-friction bearing means with said pivot pin at a second station, and mechanism for moving said supporting means from said first station to said second station.

2. In apparatus for assembling two apertured elements to afford a pivotal connection therebetween, the combination with a conveyor movable in a predetermined path, of means on said conveyor for supporting said elements with the apertures thereof in substantial alignment, means adjacent said path for inserting a pivot member in said apertures, and means adjacent said path and spaced in the direction thereof from said last named means for associating antifriction bearing means with said pivot member.

3. In apparatus for assembling a pivotal connection between two apertured elements, the combination with means supporting said elements with the apertures thereof in alignment, means for inserting a pivot pin in the aligned apertures at one station, means for associating anti-friction bearing means with said pivot pin at a second station, means for locking said anti-friction means in position at a third station, and mechanism for conveying said supporting means between said stations.

4. In apparatus for assembling a pivotal connection between two apertured elements, the combination with means supporting said elements with the apertures thereof in alignment, means for inserting a pivot pin in the aligned apertures at one station, means for associating anti-friction bearing means with said pivot pin at a second station, and means guiding said supporting means for displacement from said first station to said second station.

5. In apparatus for assembling articulated elements having apertures therein, the combination with means supporting said elements, means disposed adjacent said supporting means and movable through the apertures in said elements to align the same, means for inserting a pivot member in said apertures, said last named means effecting displacement of said aligning means from said apertures through engagement of said pivot member therewith, means spaced from said aligning means for associating anti-friction bearing means with said pivot member, and conveying mechanism for displacing said supporting means to remove said elements from operative relation with said aligning means into operative relation with said last named means.

ROBERT N. BROWN.